US010091797B2

United States Patent
Irnich et al.

(10) Patent No.: US 10,091,797 B2
(45) Date of Patent: Oct. 2, 2018

(54) DIFFERENTIATED ADAPTATION OF SELECTION PROBABILITIES FOR FREQUENCY CHANNEL SELECTION

(71) Applicant: Telefonaktiebolaget LM Ericsson (publ), Stockholm (SE)

(72) Inventors: Tim Irnich, Neuss (DE); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 15/516,050

(22) PCT Filed: Oct. 2, 2014

(86) PCT No.: PCT/EP2014/071156
§ 371 (c)(1),
(2) Date: Mar. 31, 2017

(87) PCT Pub. No.: WO2016/050308
PCT Pub. Date: Apr. 7, 2016

(65) Prior Publication Data
US 2017/0251483 A1    Aug. 31, 2017

(51) Int. Cl.
*H04W 72/08* (2009.01)
*H04W 16/10* (2009.01)
(Continued)

(52) U.S. Cl.
CPC ......... *H04W 72/082* (2013.01); *H04L 5/0033* (2013.01); *H04W 16/10* (2013.01);
(Continued)

(58) Field of Classification Search
CPC ............. H04W 72/082; H04W 72/085; H04W 72/0453; H04W 16/10; H04W 84/18; H04W 84/12; H04L 5/0033
See application file for complete search history.

(56) References Cited

U.S. PATENT DOCUMENTS

2007/0149230 A1* 6/2007 Song .................... H04W 72/02
                                                    455/515

FOREIGN PATENT DOCUMENTS

WO    2011015905 A1    2/2011
WO    2012042158 A1    4/2012

OTHER PUBLICATIONS

Leith, D. et al., "A Self-Managed Distributed Channel Selection Algorithm for WLANs", 2006 4th International Symposium on Modeling and Optimization in Mobile, Ad Hoc and Wireless Networks, Apr. 3-6, 2006, pp. 1-9, Boston, MA, US.
(Continued)

*Primary Examiner* — Afshawn M Towfighi
(74) *Attorney, Agent, or Firm* — Sage Patent Group

(57) ABSTRACT

An access node (100) of a wireless communication network assigns a selection probability to each of a plurality of frequency channels. On the basis of the selection probabilities, the access node (100) randomly selects one of the frequency channels as current operating frequency channel of the access node (100). Further, the access node (100) determines a channel quality of the current operating frequency channel. In response to the channel quality of the current operating frequency channel complying with a configured selection criterion, the access node (100) maintains the current operating frequency channel. In response to the channel quality of the current operating frequency channel not complying with the configured selection criterion, the access node selects, randomly on the basis of the selection probabilities, a further one of the frequency channels for evaluation and compares a channel quality of the frequency channel selected for evaluation to the channel quality of the current operating frequency channel. In response to the channel quality of the frequency channel selected for evaluation being higher than the channel quality of the current operating frequency channel, the access node (100) sets the (Continued)

frequency channel selected for evaluation as new operating frequency channel of the access node (100). In response to the channel quality of the frequency channel selected for evaluation not being higher than the channel quality of the current operating frequency channel, the access node (100) maintains the current operating frequency channel and decrementing the selection probability assigned to the frequency channel selected for evaluation.

29 Claims, 4 Drawing Sheets

(51) Int. Cl.
    *H04L 5/00*         (2006.01)
    *H04W 72/04*      (2009.01)
    *H04W 84/12*      (2009.01)
    *H04W 84/18*      (2009.01)

(52) U.S. Cl.
    CPC ..... *H04W 72/0453* (2013.01); *H04W 72/085* (2013.01); *H04W 84/12* (2013.01); *H04W 84/18* (2013.01)

(56) References Cited

OTHER PUBLICATIONS

Chen, X. et al., "Database-Assisted Distributed Spectrum Sharing", IEEE Journal on Selected Areas in Communications, Nov. 1, 2013, pp. 2349-2361, vol. 31, No. 11.

\* cited by examiner

DIFFERENTIATED ADAPTATION OF SELECTION PROBABILITIES FOR FREQUENCY CHANNEL SELECTION

TECHNICAL FIELD

The present invention relates to methods for controlling frequency channel utilization in a wireless communication network and to corresponding devices.

BACKGROUND

In cellular networks, e.g., as specified by 3GPP (3$^{rd}$ Generation Partnership Project), increasing traffic demand results in a need for more radio spectrum bandwidth. One way to provide more radio spectrum bandwidth is expansion into unlicensed frequency spectra, e.g., as typically used by WLAN (Wireless Local Area Network) technologies. For example, in 3GPP meeting contribution RP-140240, 3GPP TSG RAN Meeting #63, Fukuoka, Japan, 3-6 Mar. 2014, it is proposed to study extension of the LTE (Long Term Evolution) radio technology for operation in unlicensed frequency bands.

In an unlicensed frequency band, typically more bandwidth than the maximum standardized LTE carrier bandwidth (currently 20 MHz) is available. Accordingly, the conventional practice of running all LTE base stations of a network on the same frequency may be suboptimal since the larger available bandwidth allows for reducing intra-cell interference by distributing base stations over multiple different frequency channels. Further, channel quality in unlicensed frequency bands may vary depending on time, location and/or frequency, which means that also the optimum selection of the frequency channel may vary for each base station. Therefore, it is generally desirable to perform selection of the frequency channels for the base stations on the basis of a constantly running automated algorithm.

In a general context, the problem of frequency channel selection has been studied intensively for a long time and many different algorithms have been proposed. On a high-level, one may distinguish algorithms that are intended for offline frequency planning of cellular networks like GSM, and real-time algorithms that are intended to be implemented as a Self-optimizing Network (SON) feature in base stations. The main difference between these two categories is the amount if input information they require and the computation time until they deliver results. Offline algorithms are typically allowed to run for a very long time (hours, days) and can afford a significantly higher computational complexity, while real-time algorithms should deliver results in seconds or faster, and may need to cope with limited input information.

Frequency selection algorithms can be implemented in a distributed or a centralized way. Distributed means that independent algorithm instances run, for example, in each base station. The different algorithm instances influence each other for example in terms of how much interference another instance sees on a given channel. In a centralized approach, all information is gathered in a central location, which allows for a more complete assessment of the overall situation and facilitates finding an optimal solution. Distributed algorithms have a higher risk of being trapped in local minima and are typically iterative, i.e., which means that the system typically runs through a number of suboptimal stages before it may reach a steady state. In a centralized algorithm, even if it is based on iterations, system operation can converge in one step. Further, a centralized algorithm is more likely to find a global optimum because information from various parts of the network can be considered. In each case, finding an algorithm which offers a suitable tradeoff between system performance gains, computational complexity, execution time and other aspects is a complex task.

A distributed algorithm for WLAN technologies is for example described in "A Self-Managed Distributed Channel Selection Algorithm for WLANs" by D. J. Leith et al., Modeling and Optimization in Mobile, Ad Hoc and Wireless Networks, 4th International Symposium on Modeling and Optimization in Mobile, Ad Hoc and Wireless Networks, pp. 1-9, 3-6 Apr. 2006. This algorithm uses channel selection probabilities based on interference measurements. If measured interference exceeds a threshold, the channel selection probability of this channel is reduced by the same amount. However this algorithm may in some case provide insufficient efficiency in terms of finding the best channel and speed of convergence.

Accordingly, there is a need for techniques which allow for efficiently controlling frequency channel utilization in a cellular network.

SUMMARY

According to an embodiment of the invention, a method of controlling utilization of plurality of frequency channels in a wireless communication network is provided. According to the method, an access node of the wireless communication network assigns a selection probability to each of the frequency channels. On the basis of the selection probabilities, the access node randomly selects one of the frequency channels as current operating frequency channel of the access node. Further, the access node determines a channel quality of the current operating frequency channel. In response to the channel quality of the current operating frequency channel complying with a configured selection criterion, the access node maintains the current operating frequency channel. In response to the channel quality of the current operating frequency channel not complying with the configured selection criterion, the access node selects, randomly on the basis of the selection probabilities, a further one of the frequency channels for evaluation and compares a channel quality of the frequency channel selected for evaluation to the channel quality of the current operating frequency channel. In response to the channel quality of the frequency channel selected for evaluation being higher than the channel quality of the current operating frequency channel, the access node sets the frequency channel selected for evaluation as new operating frequency channel of the access node. In response to the channel quality of the frequency channel selected for evaluation not being higher than the channel quality of the current operating frequency channel, the access node maintains the current operating frequency channel and decrementing the selection probability assigned to the frequency channel selected for evaluation.

According to a further embodiment of the invention, an access node for a wireless communication network is provided. The access node comprises an interface for communication on one or more of a plurality of frequency channels. Further, the access node comprises at least one processor. The at least one processor is configured to assign a selection probability to each of the frequency channels. Further, the at least one processor is configured to, on the basis of the selection probabilities, randomly select one of the frequency channels as current operating frequency channel of the access node. Further, the at least one processor is configured to determine a channel quality of the current operating frequency channel. Further, the at least one processor is configured to, in response to the channel quality of the current operating frequency channel complying with a configured selection criterion, maintain the current operating frequency channel, and in response to the channel quality of the current operating frequency channel not complying with the configured selection criterion, select randomly on the basis of the selection probabilities a further one of the frequency channels for evaluation and compare a channel quality of the frequency channel selected for evaluation to the channel quality of the current operating frequency channel. Further, the at least one processor is configured to, in response to the channel quality of the frequency channel selected for evaluation being higher than the channel quality of the current operating frequency channel, set the frequency channel selected for evaluation as new operating frequency channel of the access node, and in response to the channel quality of the frequency channel selected for evaluation not being higher than the channel quality of the current operating frequency channel, maintain the current operating frequency channel and decrement the selection probability assigned to the frequency channel selected for evaluation.

According to a further embodiment of the invention, a computer program or computer program product is provided, e.g., in the form of a non-transitory storage medium, which comprises program code to be executed by at least one processor of an access node of a wireless communication network. Execution of the program code causes the at least one processor to assign a selection probability to each of the frequency channels. Further, the at least one processor is configured to, on the basis of the selection probabilities, randomly select one of the frequency channels as current operating frequency channel of the access node. Further, execution of the program code causes the at least one processor to determine a channel quality of the current operating frequency channel. Further, execution of the program code causes the at least one processor to, in response to the channel quality of the current operating frequency channel complying with a configured selection criterion, maintain the current operating frequency channel, and in response to the channel quality of the current operating frequency channel not complying with the configured selection criterion, select randomly on the basis of the selection probabilities a further one of the frequency channels for evaluation and compare a channel quality of the frequency channel selected for evaluation to the channel quality of the current operating frequency channel. Further, execution of the program code causes the at least one processor to, in response to the channel quality of the frequency channel selected for evaluation being higher than the channel quality of the current operating frequency channel, set the frequency channel selected for evaluation as new operating frequency channel of the access node, and in response to the channel quality of the frequency channel selected for evaluation not being higher than the channel quality of the current operating frequency channel, maintain the current operating frequency channel and decrement the selection probability assigned to the frequency channel selected for evaluation.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to concepts for controlling utilization of a plurality of frequency channels in a wireless communication network. In the illustrated embodiments, the wireless communication network is assumed to be a cellular network, e.g., based on LTE radio access technology. However, it should be understood that the concepts could also be applied in connection with other radio access technologies, e.g., Universal Mobile Telecommunications System (UMTS) radio access technology. Further, the illustrated concepts may also be applied in other kinds of wireless communication networks, e.g., in WLANs. The illustrated channel selection algorithm is assumed to be implemented by an access node of the wireless communication network, e.g., by a base station. In typical scenarios, a plurality of access nodes may be provided, and each of these access nodes may implement the illustrated channel selection algorithm.

Figure 1:
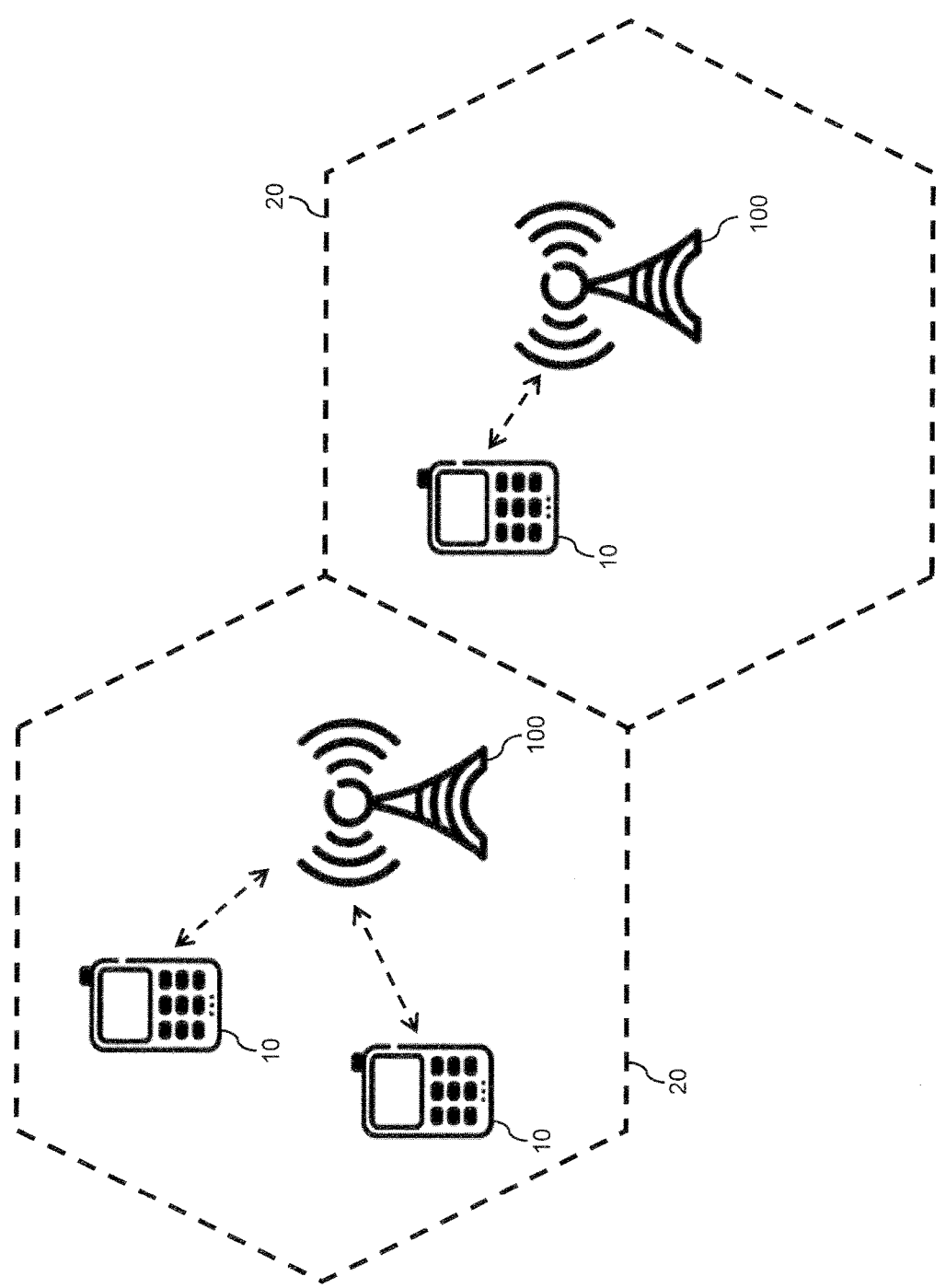
FIG. 1 schematically illustrates an exemplary wireless communication network environment in which utilization of frequency channels is controlled according to an embodiment of the invention.

FIG. 1 schematically illustrates the cellular network and exemplary elements which may be involved in implementing the channel selection algorithm. In particular, FIG. 1 illustrates multiple cells 20 of the cellular network. As further illustrated, in each of the cells, one or more user equipments (UEs) 10 may be served by an access node, in particular a base station 100 of the cell 20.

It is to be understood that the scenario as illustrated in FIG. 1 is simplified to provide a better overview and that in practical implementations a larger number of cells and corresponding access nodes may be present.

In the illustrated concepts, a selection probability is assigned to each of the frequency channels. For example, initially equal selection probabilities may be assigned to each of the frequency channels, e.g., by setting $p_n$ to $1/c$, where $p_n$ is the selection probability of the n-th frequency channel, c is the number of the frequency channels, and $n=1, \ldots, c$ respectively denotes an index of the frequency channels. The sum of the probabilities for all n is thus one (i.e., $\Sigma p_n = 1$). On the basis of the selection probabilities, one of the frequency channels is randomly selected and set as operating frequency channel. A channel quality of the current operating frequency channel is determined, e.g., on the basis of measurements performed by the access node or by one or more UEs served by the access node. The channel quality is compared to a configured selection criterion, e.g., to a threshold value. If the selection criterion is met, the access node maintains the current operating frequency channel. If the selection criterion is not met, the access node selects a further one of the frequency channels for evaluation. This is again accomplished randomly on the basis of the selection probabilities. The access node then checks whether this frequency channel offers a higher channel quality than the current operating frequency channel. If this is not the case, the access node maintains the current operating frequency channel. If the frequency channel selected for evaluation offers a higher channel quality than the current operating frequency channel, the access node sets this frequency channel as new operating frequency channel of the access node.

In the course of this checking of different frequency channels, the selection probabilities are adapted in a differentiated manner. Specifically, if the selection criterion is met by the current operating frequency channel, the selection probability of the current operating frequency channel may be incremented, while the selection probabilities of the other frequency channels are decremented. Further, if the selection criterion is not met by the current operating frequency channel, the selection probability of the current operating frequency channel may be decremented, while the selection probabilities of the other frequency channels are incremented. Further, if the frequency channel selected for evaluation does not offer a higher channel quality than the current operating frequency channel, the selection probability of the frequency channel selected for evaluation may be decremented, while the selection probabilities of the other frequency channels are incremented. Accordingly, frequency channels with positive evaluation results, i.e., meeting the selection criterion, will have a higher probability of being selected in future evaluations. Still further, a new operating frequency channel may be set if it provides a higher channel quality than the current operating frequency channel, even if it does not meet the selection criterion.

The channel selection algorithm may allow obtaining an optimized selection of operating frequency channels without requiring an excessive number of iterations. Further, since the current operating frequency channel is maintained until another frequency channel offering a higher channel quality is found, unnecessary switching of frequency channels can be avoided.

Figure 2:
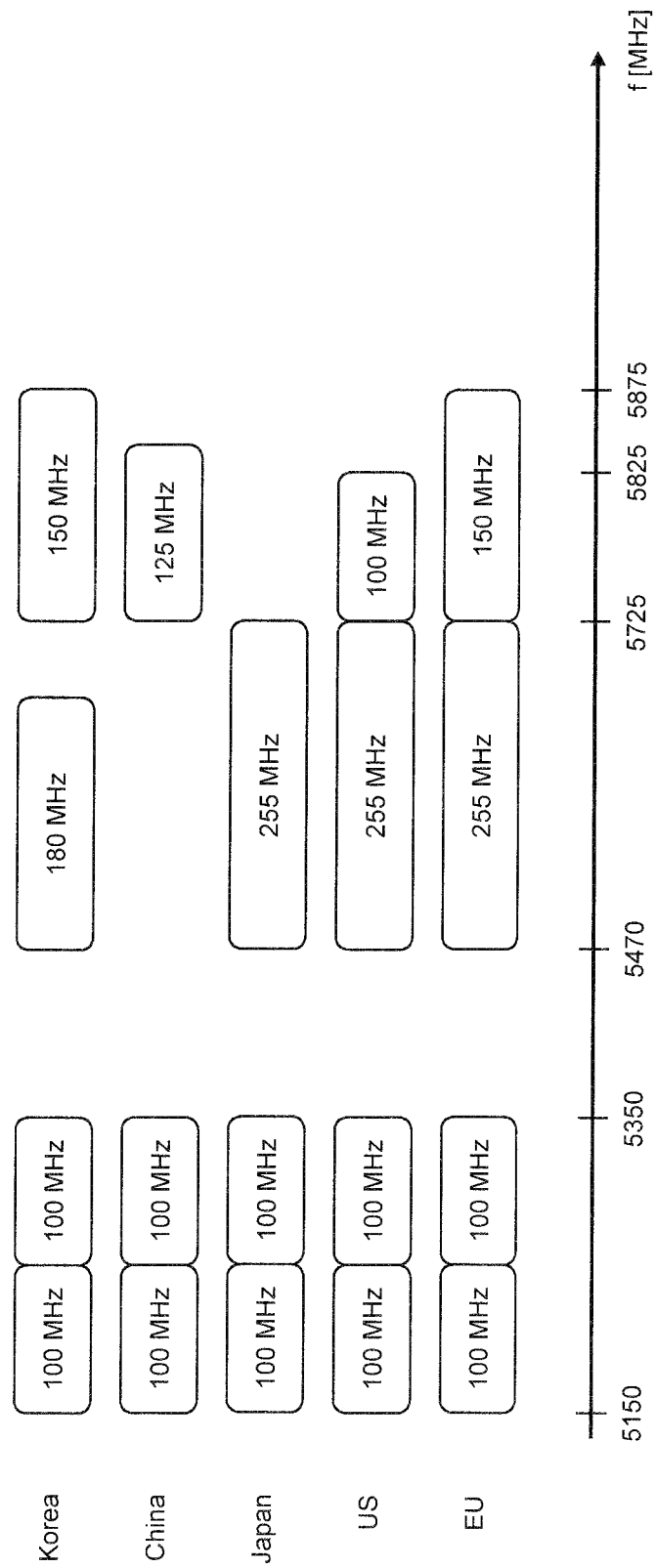
FIG. 2 schematically illustrates an unlicensed frequency spectrum in which the frequency channels may be located according to an embodiment of the invention.

FIG. 2 shows an example of a frequency spectrum from which the frequency channels may be selected. More specifically, FIG. 2 illustrates an unlicensed frequency spectrum in the region of 5 GHz for various regions, including Europe (EU), the USA, Japan, China, and Korea. As can be seen, in each region, an unlicensed frequency band between 5150 MHz and 5250 MHz and an unlicensed frequency band between 5250 MHz and 5350 MHz are available. Further, unlicensed frequency bands may be available in a range between 5470 MHz and 5875 MHz. The bandwidths of these unlicensed frequency bands are from 100 MHz to 255 MHz, which is larger than the maximum bandwidth supported by the LTE radio technology. Accordingly, each of such frequency bands may support multiple frequency channels of the LTE radio technology, which may be assigned to different base stations to avoid interference.

Figure 3:
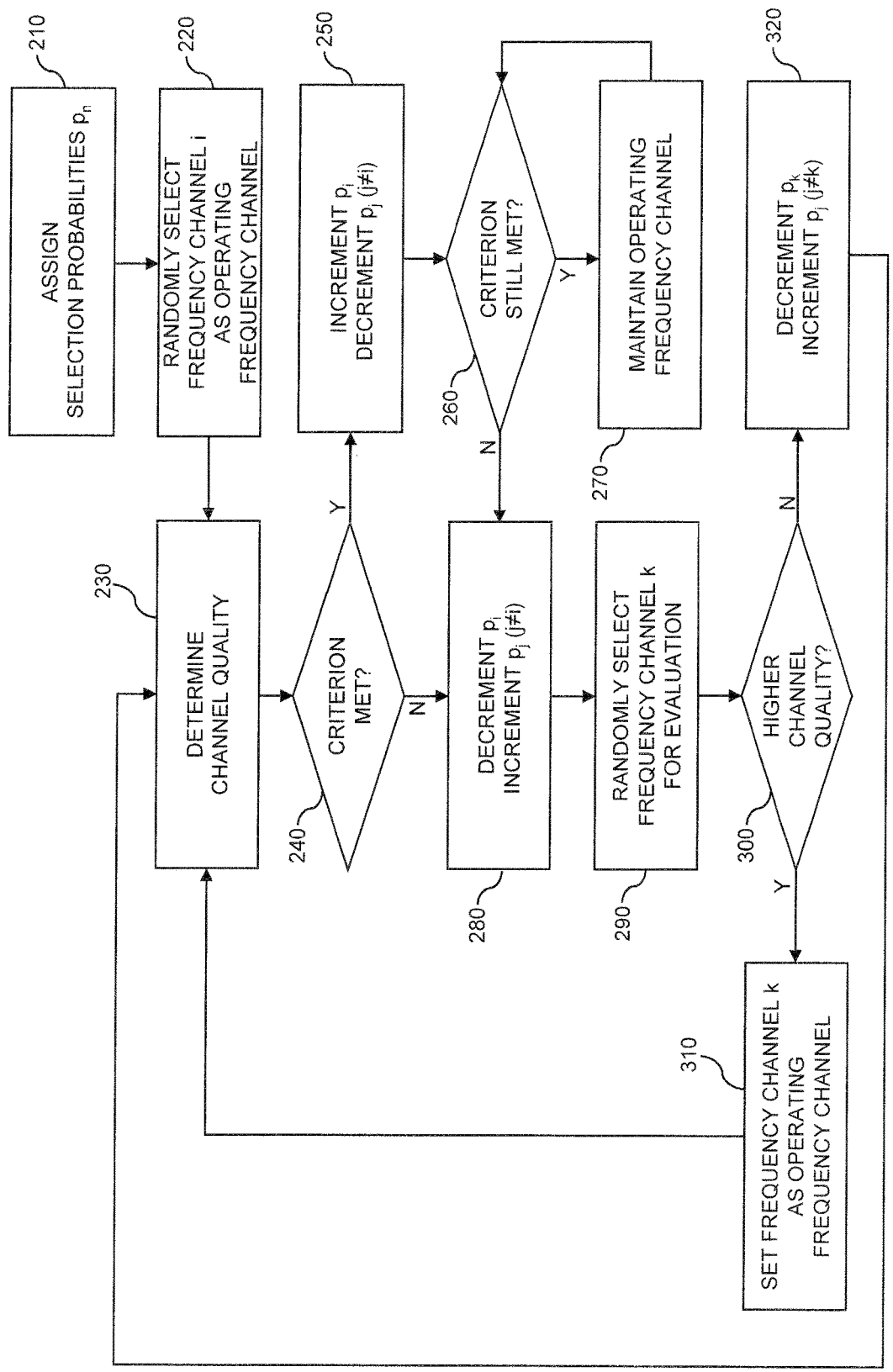
FIG. 3 shows a flowchart for illustrating a method of controlling utilization of frequency channels according to an embodiment of the invention.

FIG. 3 shows a flowchart for illustrating a method of controlling utilization of a plurality of frequency channels in a wireless communication network, e.g., in a cellular network. The method may be used for implementing the above-described concepts in an access node of the wireless communication network, e.g., in a base station, such as one of the base stations 100. If a processor based implementation of the access node is used, the steps of the method may be performed by one or more processors of the node. For this purpose, the processor(s) may execute correspondingly configured program code. Further, at least some of the corresponding functionalities may be hardwired in the processor (s).

The frequency channels may be from an unlicensed frequency spectrum, i.e., a frequency spectrum which is not exclusively assigned to the cellular network and may also be utilized by other cellular networks or other radio technologies. The frequency channels may also be from a shared licensed frequency spectrum, i.e., a frequency spectrum which is assigned to the cellular network by a regulatory authority but shared with a known and limited set of other spectrum users.

At step 210, the access node assigns a selection probability to each of the frequency channels. For example, the access node may assign equal selection probabilities to the frequency channels, e.g., by setting $p_n$ to $1/c$, where $p_n$ is the selection probability of the n-th frequency channel, c is the number of the frequency channels, and n=1, . . . , c respectively denotes an index of the frequency channels. In alternative scenarios, the access node may assign unequal selection probabilities to the frequency channels, thereby allowing for an initial prioritization of one or more of the frequency channels. Such initial assignment of unequal selection probabilities may for example be based on information learned from past executions of the channel selection algorithm or may be based on preconfigured settings of the access node.

At step 220, the access node randomly selects one of the frequency channels as current operating frequency channel of the access node. This is accomplished on the basis of the selection probabilities assigned to the frequency channels. In the method of FIG. 3, it is assumed that the frequency channel with index i is selected at step 220.

At step 230, the access node determines a channel quality of the current operating frequency channel. For example, the access node may determine the channel quality on the basis of measurements performed by the access node and/or by communication devices served by the access node, such as by the UEs.

At step 240 the node checks whether the channel quality of the current operating frequency channel meets a configured selection criterion, e.g., by comparing the channel quality to a threshold value. If the selection criterion is met, the method continues with step 250, as illustrated by branch "Y". If the selection criterion is not met, the method continues with step 280, as illustrated by branch "N".

At step 250, in response to the channel quality of the current operating frequency channel complying with the configured selection criterion, the access node may increment the selection probability assigned to the current operating frequency channel. This may be accomplished by setting the selection probability to $(1+d)p_i$, where $p_i$ denotes the selection probability of current operating frequency channel, i denotes the index of the current operating frequency channel, and d denotes an incrementation parameter. At the same time, the access node may decrement the selection probabilities assigned to the other frequency channels. This may be accomplished by setting the selection probabilities to $(1+d)p_j-d/(c-1)$, where c is the number of the frequency channels and j denotes a respective index of the other frequency channels.

At step 260, the access node may recheck whether the channel quality of the current operating frequency channel still meets the configured selection criterion. This may for example involve re-determining the channel quality of the current operating frequency channel and comparing the re-determined channel quality to the configured selection criterion. If the selection criterion is met, the method continues with step 270, as illustrated by branch "Y". If the selection criterion is not met, the method continues with step 280, as illustrated by branch "N".

At step 270, the access node maintains the current operating frequency channel. As illustrated, the method may then return to step 260 to repeat the check whether the channel quality of the current operating frequency channel still meets the configured selection criterion.

At step 280, in response to the channel quality of the current operating frequency channel not complying with the configured selection criterion, the access node may decrement the selection probability assigned to the current operating frequency channel. This may be accomplished by setting the selection probability to $(1-b)p_i$, where $p_i$ denotes the selection probability of the frequency channel selected for evaluation, i denotes the index of the current operating frequency channel, and b denotes a decrementation parameter. The decrementation parameter b may be chosen to be smaller than the above-mentioned incrementation parameter d, e.g., by a factor of 2 to 10. At the same time, the access node may increment the selection probabilities assigned to the other frequency channels. This may be performed by setting the selection probabilities to $(1-b)p_j+b/(c-1)$, where c is the number of the frequency channels and j denotes a respective index of the other frequency channels.

At step 290, the access node selects a further one of the frequency channels for evaluation. This is accomplished again randomly on the basis of the selection probabilities. In the method of FIG. 3, it is assumed that the frequency channel with index k is selected at step 290.

At step 300, the access node compares a channel quality of the frequency channel selected for evaluation, i.e., the frequency channel k, to the channel quality of the current operating frequency channel, i.e., the frequency channel i. This may for example involve determining the channel quality of the frequency channel selected for operation, e.g., by on the basis of measurements performed by the access node and/or by communication devices served by the access node, such as by the UEs. For performing such measurements, the access node may temporarily switch to the frequency channel selected for evaluation, e.g., for the duration of the measurement, however while still maintaining the current operating frequency channel and without performing handovers of UEs to the frequency channel selected for evaluation. Further, the comparison of step 300 may also involve re-determining the channel quality of the current operating frequency channel.

If the comparison of step 300 shows that the channel quality of the frequency channel selected for evaluation is higher than the channel quality of the current operating frequency channel, the method continues with step 310, as illustrated by branch "Y". If the comparison of step 300 shows that the channel quality of the frequency channel selected for evaluation is not higher than the channel quality of the current operating frequency channel, the method continues with step 320, as illustrated by branch "N".

At step 310, in response to the channel quality of the frequency channel selected for evaluation being higher than the channel quality of the current operating frequency channel, the access node sets the frequency channel selected for evaluation, i.e., the frequency channel k as new operating frequency channel of the access node. As illustrated, the method may then return to step 230 to repeat the determination of the channel quality of the current operating frequency channel (now the frequency channel k) and then check whether the configured selection criterion is met (at step 240).

At step 320, in response to the channel quality of the frequency channel selected for evaluation not being higher than the channel quality of the current operating frequency channel, the access node maintains the current operating frequency channel and decrements the selection probability assigned to the frequency channel selected for evaluation. This may be performed by setting the selection probability to $(1-b')p_k$, where $p_k$ denotes the selection probability of the frequency channel selected for evaluation, k denotes the index of the frequency channel selected for evaluation, and b' is a decrementation parameter. The decrementation parameter b' may be larger than the above-mentioned decrementation parameter b, e.g., by a factor of 2 to 5. At the same time, the access node may increment the selection probabilities assigned to the other frequency channels. This may be performed by setting the selection probabilities to $(1-b)p_j+b'/(c-1)$, where c is the number of the frequency channels and j denotes a respective index of the other frequency channels. As illustrated, the method may then return to step 230 to repeat the determination of the channel quality of the current operating frequency channel and then check whether the configured selection criterion is met (at step 240).

As can be seen, the method involves adaptation of the selection probabilities of the frequency channels. Accordingly, frequency channels with positive evaluations, i.e., which met the selection criterion in the past, will be re-selected with higher probabilities in the future. Similarly, frequency channels with negative evaluations, i.e., which did not meet the selection criterion or showed a lower channel quality than the current operating frequency channel in the past, will be re-selected with lower probabilities in the future, thereby allowing faster exploration of the other frequency channels. As can further be seen, the selection probabilities may be adapted in such a way that they always remain lower than 1, but larger than 0, which means that all frequency channels will be re-evaluated with a certain probability.

The method will now be further illustrated by considering a specific example assuming four frequency channels. In this example, a mean SINR (Signal to Interference plus Noise Ratio), is assumed to be 5 dB for the first frequency channel, 10 dB for the second frequency channel, 15 dB for the third frequency channel, and 11 dB for the fourth frequency channel. The above-mentioned parameters are assumed to be b=0.1, b'=0.2, and d=0.5. The selection criterion is assumed to be defined in terms of a threshold SINR of 12 dB, above which the selection criterion is considered to be met.

Initially, an equal selection probability $p_1=p_2=p_3=p_4=0.25$ is assigned to each of the frequency channels. The initial random selection of the operating frequency channel is assumed to yield the second frequency channel, which causes the access node to select the second frequency channel as current operating frequency channel. For this frequency channel the SINR is monitored and compared to the SINR threshold of 12 dB. This comparison shows that the selection criterion is not met. Accordingly, the selection probabilities are updated as follows:

$$p_1=(1-b)p_1+0.1/3=0.2583,$$

$$p_2=(1-b)p_2=0.2250,$$

$$p_3=(1-b)p_3+0.1/3=0.2583,$$

$$p_4=(1-b)p_4+0.1/3=0.2583.$$

Next, the access node randomly selects a further one of the frequency channels for evaluation.

If at this point the first frequency channel would be selected for evaluation, the comparison of the channel qualities will show that the first frequency channel does not provide a higher channel quality and the access node will thus not set this frequency channel as new operating frequency channel, but rather maintain the current operating frequency channel. The selection probabilities would then be updated according to:

$$p_1=(1-b')p_1=0.2066,$$

$$p_2=(1-b')p_2+0.2/3=0.2467,$$

$$p_3=(1-b')p_3+0.2/3=0.2733,$$

$$p_4=(1-b')p_4+0.2/3=0.2733.$$

If the third frequency channel would be selected is selected for evaluation, the comparison of the channel qualities will show that the third frequency channel does provide a higher channel quality and the access node will thus set this frequency channel as new operating frequency channel. In the present iteration of the channel selection algorithm, there would be no updating of the selection probabilities. However, in the next iteration the selection probabilities would be updated because, the selection criterion is met by the newly set operating frequency channel, according to:

$$p_1=(1+d)p_1-0.5/3=0.2208,$$

$$p_2=(1+d)p_2-0.5/3=0.0875,$$

$$p_3=(1+d)p_3=0.3874,$$

$$p_4=(1+d)p_4-0.5/3=0.2208.$$

The access node would then maintain the third frequency channel as its operating frequency channel until its SINR drops below the SINR threshold of 12 dB.

If the fourth frequency channel would be selected for evaluation, the comparison of the channel qualities will show that the fourth frequency channel does provide a higher channel quality and the access node will thus set this frequency channel as new operating frequency channel, even though the selection criterion is not met. In this case, there would be no updating of the selection probabilities in the present iteration of the channel selection algorithm. However, the selection probabilities would be updated in the next iteration, because the newly set operating frequency channel does not meet the selection criterion, namely according to:

$$p_1=(1-b)p_1+0.1/3=0.2658,$$

$$p_2=(1-b)p_2+0.1/3=0.2358,$$

$$p_3=(1-b)p_3+0.1/3=0.2658,$$

$$p_4=(1-b)p_4=0.2325.$$

Figure 4:
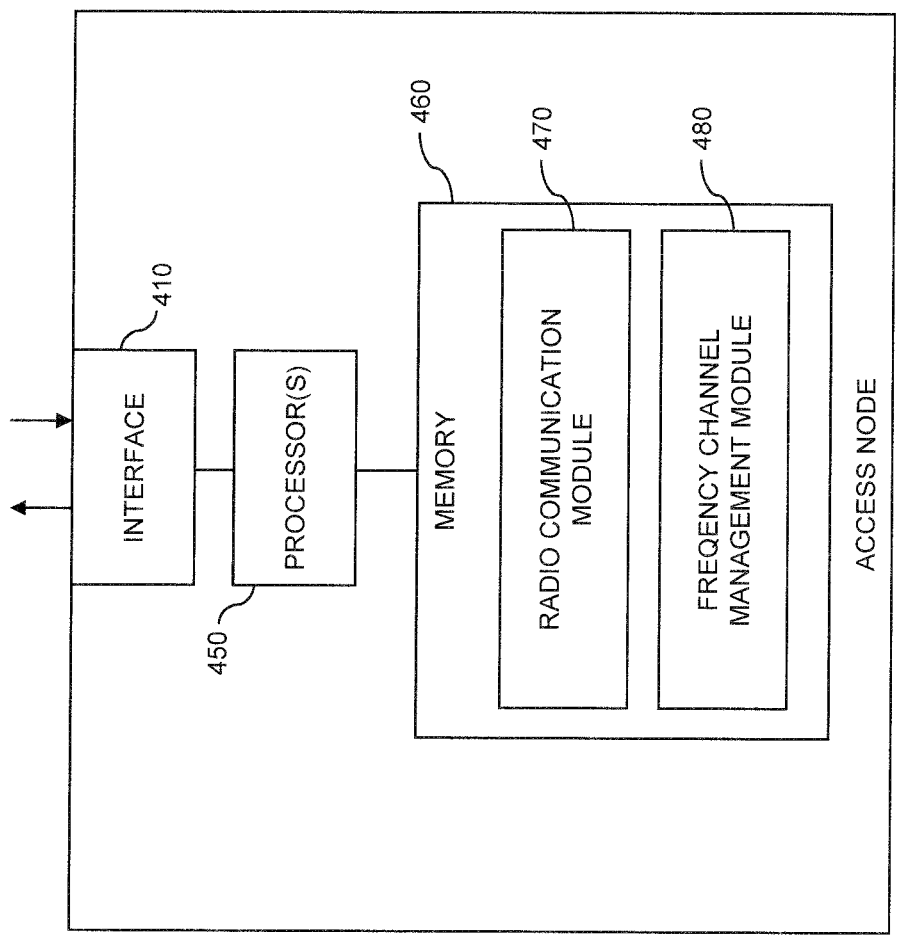
FIG. 4 schematically illustrates structures of an access node according to an embodiment of the invention.

FIG. 4 illustrates exemplary structures which may be used for implementing the above concepts in an access node of a wireless communication network, e.g., a base station such as one of the base stations 100.

As illustrated, the access node may include an interface 410 for communication with communication devices, such as the UEs 10. This communication may be on one or more of the plurality of the frequency channels, selected according to the channel selection algorithm as explained above.

Further, the access node includes one or more processors 450 coupled to the interface 410, and a memory 460 coupled to the processor(s) 450. The memory 460 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 460 includes suitably configured program code to be executed by the processor(s) 450 so as to implement the above-described functionalities of the access node. In particular, the memory 460 may include various program code modules for causing the access node to perform processes as described above, e.g., corresponding to the method steps of FIG. 3. As illustrated, the memory 460 may include a frequency channel management module 470 for implementing the above-described functionalities of the channel selection algorithm. Further, the memory 460 may include a control module 480 for implementing various control functionalities, such as controlling measurements for determining the channel qualities required by the channel selection algorithm.

It is to be understood that the structures as illustrated in FIG. 4 are merely schematic and that the access node may actually include further components which, for the sake of clarity, have not been illustrated, e.g., further interfaces or processors. Also, it is to be understood that the memory 460 may include further types of program code modules, which have not been illustrated, e.g., program code modules for implementing known functionalities of an access node. According to some embodiments, also a computer program may be provided for implementing functionalities of the access node, e.g., in the form of a physical medium storing the program code and/or other data to be stored in the memory 460 or by making the program code available for download or by streaming.

As can be seen, the concepts as described above may be used for efficiently controlling utilization of a plurality of frequency channels in a wireless communication network. In particular, due to the differentiated adaptation of the selection probabilities, fast convergence towards an optimized frequency channel selection may be achieved. Further, switching to a channel having worse channel quality can be avoided.

It is to be understood that the examples and embodiments as explained above are merely illustrative and susceptible to various modifications. For example, the illustrated concepts may be applied in connection with various radio access technologies, without limitation to the above-mentioned LTE radio access technology. Moreover, it is to be understood that the above concepts may be implemented by using correspondingly designed software to be executed by one or more processors of an existing device, or by using dedicated device hardware.

The invention claimed is:

1. A method of controlling utilization of plurality of frequency channels in a wireless communication network, the method comprising:
   an access node of the wireless communication network assigning a selection probability to each of the frequency channels;
   the access node, based on the selection probabilities, node randomly selecting one of the frequency channels as a current operating frequency channel of the access node;
   the access node determining a channel quality of the current operating frequency channel;
   in response to the channel quality of the current operating frequency channel complying with a configured selection criterion, the access node maintaining the current operating frequency channel;
   in response to the channel quality of the current operating frequency channel not complying with the configured selection criterion, the access node:

randomly selecting, based on the selection probabilities, a further one of the frequency channels for evaluation;

comparing a channel quality of the frequency channel selected for evaluation to the channel quality of the current operating frequency channel;

in response to the channel quality of the frequency channel selected for evaluation being higher than the channel quality of the current operating frequency channel, setting the frequency channel selected for evaluation as a new operating frequency channel of the access node; and in response to the channel quality of the frequency channel selected for evaluation not being higher than the channel quality of the current operating frequency channel, maintaining the current operating frequency channel and decrementing the selection probability assigned to the frequency channel selected for evaluation.

2. The method of claim 1, wherein the access node performs the decrementing of the selection probability of by setting the selection probability to $(1-b')p_k$, where $p_j$ denotes the selection probability of the frequency channel selected for evaluation, k denotes an index of the frequency channel selected for evaluation, and b' is a decrementation parameter.

3. The method of claim 2, further comprising the access node, in response to the channel quality of the frequency channel selected for evaluation not being higher than the channel quality of the current operating frequency channel of the access node, incrementing the selection probabilities assigned to the other frequency channels.

4. The method of claim 3, wherein the access node performs the incrementing of the selection probabilities by setting the selection probabilities to $(1-b')p_j+b'(c-1)$, where c is the number of the frequency channels and j denotes a respective index of the other frequency channels.

5. The method of claim 1, further comprising the access node, in response to the channel quality of the current operating frequency channel complying with the configured selection criterion, incrementing the selection probability assigned to the current operating frequency channel.

6. The method of claim 5, wherein the access node performs the incrementing of the selection probability by setting the selection probability to $(1+d)p_i$, where $p_i$ denotes the selection probability of current operating frequency channel, i denotes an index of the current operating frequency channel, and d denotes an incrementation parameter.

7. The method of claim 6, further comprising the access node, in response to the channel quality of the current operating frequency channel complying with the configured selection criterion, decrementing the selection probabilities assigned to the other frequency channels.

8. The method of claim 7, wherein the access node performs the decrementing of the selection probabilities by setting the selection probabilities to $(1+d)p_j-d/(c-1)$, where c is the number of the frequency channels and j denotes a respective index of the other frequency channels.

9. The method of claim 1, further comprising the access node, in response to the channel quality of the current operating frequency channel not complying with the configured selection criterion, decrementing the selection probability assigned to the current operating frequency channel.

10. The method of claim 9, wherein the access node performs the decrementing of the selection probability by setting the selection probability to $(1-b)p_i$, where $p_j$ denotes the selection probability of the frequency channel selected for evaluation, i denotes an index of the current operating frequency channel, and b denotes a decrementation parameter.

11. The method of claim 4:

further comprising the access node, in response to the channel quality of the current operating frequency channel not complying with the configured selection criterion, decrementing the selection probability assigned to the current operating frequency channel;

wherein the access node performs the decrementing of the selection probability by setting the selection probability to $(1-b)p_i$, where $p_j$ denotes the selection probability of the frequency channel selected for evaluation, i denotes an index of the current operating frequency channel, and b denotes a decrementation parameter;

wherein b' is larger than b.

12. The method of claim 1, wherein the selection probabilities are always lower than 1.

13. The method of claim 1, wherein the frequency channels are from an unlicensed frequency spectrum.

14. The method of claim 1, wherein the frequency channels are from a shared licensed frequency spectrum.

15. An access node for a wireless communication network, the access node comprising:

an interface for communication on one or more of a plurality of frequency channels; and processing circuitry configured to:

assign a selection probability to each of the frequency channels;

based on the selection probabilities, randomly select one of the frequency channels as a current operating frequency channel of the access node;

determine a channel quality of the current operating frequency channel;

in response to the channel quality of the current operating frequency channel complying with a configured selection criterion, maintain the current operating frequency channel;

in response to the channel quality of the current operating frequency channel not complying with the configured selection criterion:

randomly select, based on the selection probabilities a further one of the frequency channels for evaluation;

compare a channel quality of the frequency channel selected for evaluation to the channel quality of the current operating frequency channel;

in response to the channel quality of the frequency channel selected for evaluation being higher than the channel quality of the current operating frequency channel, set the frequency channel selected for evaluation as a new operating frequency channel of the access node; and in response to the channel quality of the frequency channel selected for evaluation not being higher than the channel quality of the current operating frequency channel, maintain the current operating frequency channel and decrement the selection probability assigned to the frequency channel selected for evaluation.

16. The access node of claim 15, wherein the processing circuitry is configured to perform the decrementing of the selection probability of by setting the selection probability to $(1-b')p_k$, where $p_j$ denotes the selection probability of the frequency channel selected for evaluation, k denotes an index of the frequency channel selected for evaluation, and b' is a decrementation parameter.

17. The access node of claim 16, wherein the processing circuitry is configured to, in response to the channel quality of the frequency channel selected for evaluation not being higher than the channel quality of the current operating frequency channel of the access node, increment the selection probabilities assigned to the other frequency channels.

18. The access node of claim 17, wherein the processing circuitry is configured to perform the incrementing of the selection probabilities by setting the selection probabilities to $(1-b)p_j+b'(c-1)$, where c is the number of the frequency channels and j denotes a respective index of the other frequency channels.

19. The access node of claim 15, wherein the processing circuitry is configured to, in response to the channel quality of the current operating frequency channel complying with the configured selection criterion, increment the selection probability assigned to the current operating frequency channel.

20. The access node of claim 19, wherein the processing circuitry is configured to perform the incrementing of the selection probability by setting the selection probability to $(1+d)p_i$, where pi denotes the selection probability of current operating frequency channel, i denotes an index of the current operating frequency channel, and d denotes an incrementation parameter.

21. The access node of claim 20, wherein the processing circuitry is configured to, in response to the channel quality of the current operating frequency channel complying with the configured selection criterion, decrement the selection probabilities assigned to the other frequency channels.

22. The access node of claim 21, wherein the processing circuitry is configured to perform the decrementing of the selection probabilities by setting the selection probabilities to $(1+d)p_j-d/(c-1)$, where c is the number of the frequency channels and j denotes a respective index of the other frequency channels.

23. The access node of claim 15, wherein the processing circuitry is configured to, in response to the channel quality of the current operating frequency channel not complying with the configured selection criterion, decrement the selection probability assigned to the current operating frequency channel.

24. The access node of claim 23, wherein the processing circuitry is configured to perform the decrementing of the selection probability by setting the selection probability to $(1-b)p_i$, where $p_j$ denotes the selection probability of the frequency channel selected for evaluation, i denotes an index of the current operating frequency channel, and b denotes a decrementation parameter.

25. The access node of claim 16:
wherein the processing circuitry is configured to, in response to the channel quality of the current operating frequency channel not complying with the configured selection criterion, decrement the selection probability assigned to the current operating frequency channel;
wherein the processing circuitry is configured to perform the decrementing of the selection probability by setting the selection probability to $(1-b)p_i$, where $p_j$ denotes the selection probability of the frequency channel selected for evaluation, i denotes an index of the current operating frequency channel, and b denotes a decrementation parameter;
wherein b' is larger than b.

26. The access node of claim 15, wherein the selection probabilities are always lower than 1.

27. The access node of claim 15, wherein the frequency channels are from an unlicensed frequency spectrum.

28. The access node of claim 15, wherein the frequency channels are from a shared licensed frequency spectrum.

29. A non-transitory computer readable recording medium storing a computer program product for controlling utilization of plurality of frequency channels in a wireless communication network, the computer program product comprising software instructions which, when run on processing circuitry of an access node of the wireless communication network, causes the access node to:
assign a selection probability to each of the frequency channels;
based on the selection probabilities, node randomly select one of the frequency channels as a current operating frequency channel of the access node;
determine a channel quality of the current operating frequency channel;
in response to the channel quality of the current operating frequency channel complying with a configured selection criterion, maintain the current operating frequency channel;
in response to the channel quality of the current operating frequency channel not complying with the configured selection criterion:
randomly select, based on the selection probabilities, a further one of the frequency channels for evaluation;
compare a channel quality of the frequency channel selected for evaluation to the channel quality of the current operating frequency channel;
in response to the channel quality of the frequency channel selected for evaluation being higher than the channel quality of the current operating frequency channel, set the frequency channel selected for evaluation as a new operating frequency channel of the access node; and
in response to the channel quality of the frequency channel selected for evaluation not being higher than the channel quality of the current operating frequency channel, maintain the current operating frequency channel and decrement the selection probability assigned to the frequency channel selected for evaluation.

* * * * *